United States Patent [19]
Ouellette et al.

[11] Patent Number: 4,792,526
[45] Date of Patent: Dec. 20, 1988

[54] METHOD FOR COLLECTING AND ANALYZING HYDROCARBONS

[75] Inventors: Gregory P. Ouellette, Anaheim; Stephen R. Larter, Lake Elsinore; John R. Fox, Laguna Beach, all of Calif.

[73] Assignee: Union Oil Company of California, Los Angeles, Calif.

[21] Appl. No.: 8,856

[22] Filed: Jan. 30, 1987

Related U.S. Application Data

[62] Division of Ser. No. 451,783, Dec. 21, 1982, abandoned.

[51] Int. Cl.$^4$ .......................... G01N 1/28; G01N 33/00
[52] U.S. Cl. ..................................... 436/29; 436/139; 436/141; 436/155; 436/159; 436/160; 436/175; 436/177; 436/181
[58] Field of Search .................... 62/17, 18, 29, 59, 67, 62/74, 386, 387; 73/19; 422/68, 78, 80, 83, 93, 170, 171, 189, 190; 436/29, 30, 32, 133, 134, 146, 155, 157–160, 139, 141, 174, 175, 177, 181

[56] References Cited
FOREIGN PATENT DOCUMENTS
8101849 9/1981 Brazil.

Primary Examiner—Barry S. Richman
Assistant Examiner—Robert J. Hill, Jr.
Attorney, Agent, or Firm—Alan H. Thompson; Robert A. Franks; Gregory F. Wirzbicki

[57] ABSTRACT

The instant invention relates to the separation and collection of hydrocarbons, including methane, from a gas emanating from an earth formation to determine the hydrocarbon potential of such earth formation. The apparatus includes a sequential network of cryogenic traps, adsorbent traps and furnaces to recover methane in one such cryogenic trap as a condensed carbon dioxide sample, in combination with (i) a valve antecedent to such network and (ii) a vacuum pump subsequent to such network to continuously provide a subatmospheric pressure throughout the network and prevent condensation of oxygen or atmospheric carbon dioxide in the cryogenic traps.

8 Claims, 1 Drawing Sheet

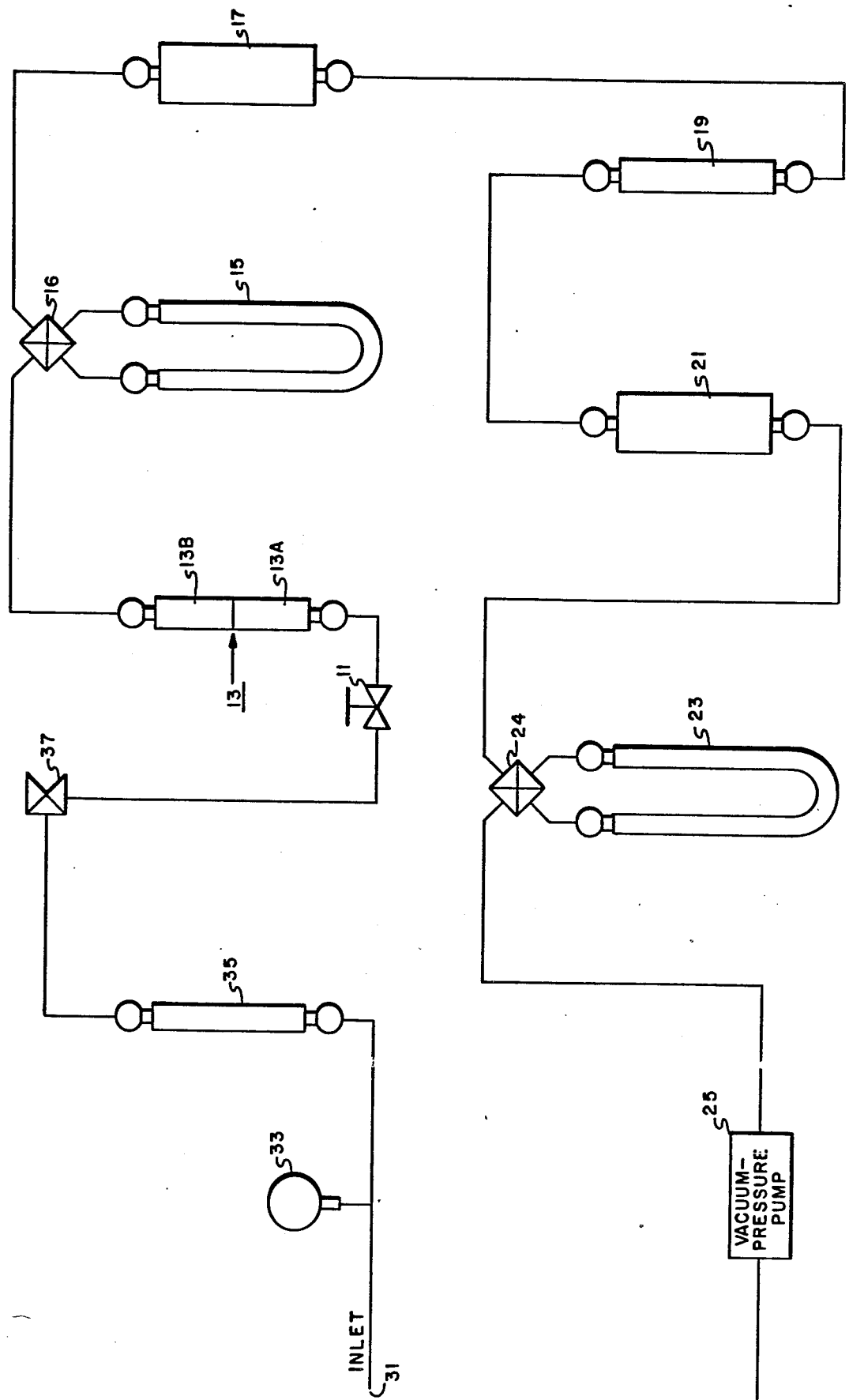

METHOD FOR COLLECTING AND ANALYZING HYDROCARBONS

This application is a division of Ser. No. 451,783 filed Dec. 21, 1982, now abandoned.

BACKGROUND OF THE INVENTION

The instant invention relates to an apparatus useful in collecting hydrocarbons emanating from an earth formation, and particularly to an apparatus for collecting small concentrations of hydrocarbons dissolved in a body of water overlaying an earth formation.

There are many systems useful for collecting samples and analyzing the samples for hydrocarbons. Such systems have been found to be useful for predicting the hydrocarbon potential of earth formations and may be utilized in exploring for oil beneath the ocean floor. In general such systems continuously sample the ocean water for methane, from which the hydrocarbon or petroleum potential of the ocean floor in the vicinity of sample collection may be predicted.

When methane has been found, it may be analyzed to determine the stable carbon isotope ratio. It is known that samples originating from the biogenic decomposition of organic matter will have a delta $^{13}$C range of −65 per thouand to −100 per thousand while methane originating from the thermogenic decomposition of organic matter will have a delta $^{13}$C range of −20 per thousand to −50 per thousand. (The delta $^{13}$C measurement is defined in *Petroleum Formation and Occurrence*, B. P. Tissot, D. H. Welte, Springer-Verlag, N.Y. (1978) at p. 88 as:

$$\text{delta } ^{13}C \text{ (per 1000)} = \frac{(^{13}C/^{12}C) \text{ sample} - (^{13}C/^{12}C) \text{ standard}}{(^{13}C/^{12}C) \text{ standard}} \times 1000$$

Thus, the stable carbon isotope ratio allows the explorer to predict whether or not the methane is derived from a petroleum source or as a result of the more recent biogenic decomposition of animal or vegetable matter. However, a relatively small amount of thermogenic methane mixed with biogenic methane can go unnoticed.

In British Pat. No. 2,074,726 a method and apparatus for predicting hydrocarbon potential of an earth formation under a body of water is disclosed. The apparatus disclosed in the British patent includes a network of adsorbent traps, furnaces and cryogenic traps which are utilized to separate and collect the components of a flowing sample that has been obtained by a sampling device positioned in the vicinity of the earth formation. The method and apparatus, while generally useful for examining the stable carbon isotope distribution of any hydrocarbons collected, is specifically concerned with information derived from the analysis of methane. It is not suggested in this patent that important information can be obtained by separating the methane from any higher hydrocarbons contained in the sample and separately analyzing both the methane and the higher hydrocarbons. This is an important failing since methane is more likely to be derived from the decomposition of animal and vegetable wastes, while the higher hydrocarbons are more generally found to be of petroleum origin.

Furthermore, the network disclosed in the British patent is indicated as terminating at a vent, through which the non-collected components of the sample are removed. It has been found that carbon dioxide from the atmosphere is able to enter the network at the vent and contaminate the sample. This a problem in view of the method of collecting the methane sample to analyze the stable carbon isotope ratio thereof. That is, methane is collected as a sample by oxidizing methane to carbon dioxide (i.e., methane-derived carbon dioxide) and condensing the carbon dioxide in a cryogenic trap. Since atmospheric carbon dioxide may have a delta $^{13}$C value of about −7 per thousand, the contamination of the condensed carbon dioxide would indicate that the methane is of thermogenic origin when in actuality it is of biogenic origin.

It is also apparent that the condensation of the oxygen of the sample in the cryogenic traps was of concern in the design of the apparatus of the British patent. As disclosed in the British patent, the methane component is condensed at a temperature within the range of from about −160° to about −180° C. To achieve this temperature either liquid argon or a mixture of isopentane and liquid nitrogen is utilized as the cryogenic medium. At lower temperatures such as −196° C. (the temperature of liquid nitrogen) oxygen may also condense. The condensed oxygen is prone to vaporize when the cryogenic trap is removed from the network for analysis of the sample contained therein. If sufficient condensed oxygen is present, the trap may burst and expel the methane sample. There are disadvantages in the utilization of either liquid argon or the mixture of isopentane and liquid nitrogen. Liquid argon is less available than liquid nitrogen and is approximately four times as expensive. The mixture of isopentane and liquid nitrogen is difficult to make up and use as a cryogenic medium. If not for the problem of condensing oxygen in the cryogenic traps at a temperature of −196° C., it would be preferable to use liquid nitrogen as the cryogenic medium.

Finally, the apparatus disclosed in the British Patent does not provide for the restriction of flow prior to the above network. Thus, the apparatus will not operate at a variable pressure. It would be desirable to utilize an apparatus for collection of hydrocarbons that could be adapted to operate at the most efficient pressure for separating the various components of the sample into fractions that provide useful information about the origin of the hydrocarbons contained therein.

Thus it is one object of the invention to provide a method for separating and collecting methane and higher hydrocarbons from a sample for separate analysis to determine whether either the methane or the higher hydrocarbons, or both are of thermogenic origin.

It is another object of the invention to provide a method for collecting and examining gaseous samples including methane wherein methane is separated from the gaseous sample by oxidation to carbon dioxide and cryogenic condensation of the carbon dioxide and wherein the condensed carbon dioxide is protected from contamination by atmospheric carbon dioxide.

It is another object of the invention to provide a method useful for the collection of hydrocarbons which method may be carried out at any pressure or flow which will maximize the efficiency of separating and collecting the various hydrocarbon fractions found in said sample.

It is another object of the invention to provide a method useful for the collection of hydrocarbons which uses a sample collection device that may be operated at the various pressures and flows emanating from such sample collection device.

Other objects and advantages of the instant invention will become apparent from the following description taken in connection with the accompanying figure, in which the preferred embodiment of this invention is set forth by way of illustration and example.

SUMMARY OF THE INVENTION

The invention resides in a method for the separation and collection of hydrocarbons, including methane, from a gas emanating from an earth formation to determine the hydrocarbon potential of such earth formation, such method including the use of a sequential network of cryogenic traps, adsorbent traps and furnaces to recover methane in one such cryogenic trap as a condensed carbon dioxide sample, and which method includes the use of the combination of (i) a valve antecedent to such network and (ii) a vacuum pump subsequent to such network to continuously provide a subatmospheric pressure throughout the network and prevent the condensation of oxygen or atmospheric carbon dioxide in the cryogenic traps.

The gas may be dissolved in water, e.g., sea water, and recovered therefrom by flashing off a gaseous mxxture including (i) methane, (ii) oxygen, (iii) one or more higher hydrocarbons having at least two carbon atoms, (iv) carbon monoxide, (v) carbon dioxide, (vi) one or more interfering gases selected from the group consisting of the oxides of sulfur and nitrogen, and (vii) water. In one embodiment, the method uses an apparatus which comprises in sequential fluid communication:

(a) a valve, adapted for varying the flow of the gaseous mixture from a sample collection device;

(b) an adsorbent-cryogenic trap adapted for (i) adsorbing water and carbon dioxide and (ii) condensing the higher hydrocarbons and the interfering gases to provide a sample including said higher hydrocarbons;

(c) a first furnace adapted for oxidizing carbon monoxide to carbon droxide, (d) an adsorbent trap adapted for adsorbing carbon dioxide, (e) a second furnace adapted for oxidizing the methane to provide methane-derived carbon dioxide;

(f) a second cryogenic trap adapted for condensing said methane-derived carbon dioxide;

(g) an outlet adapted for removing oxygen as a gas from the second cryogenic trap; and (h) a vacuum pump adapted for continuously providing a subatmospheric pressure between the valve and the outlet.

BRIEF DESCRIPTION OF THE DRAWING

The FIGURE is a schematic illustration of the preferred embodiment of the apparatus for use in the method of the invention.

DETAILED DESCRIPTION OF THE INVENTION

The instant invention may be conveniently understood by reference to the preferred embodiment illustrated in the FIGURE.

The apparatus for use in the method of this invention includes in sequential fluid communication a valve 11, an adsorbent trap 13 for adsorbing carbon dioxide and water, a cryogenic trap 15 for condensing higher hydrocarbons and interfering gases, a furnace 17 for oxidizing carbon monoxide to carbon dioxide and an adsorbent trap 19 for adsorbing the resulting carbon dioxide. The above traps and furnace effectively separate the components of the gaseous mixture that would interfere with the isotopic analysis of methane, from the methane and provide a sample of the higher hydrocarbons for analysis to determine whether the higher hydrocarbons are of petroleum origin.

In continuing fluid sequence, the apparatus for use in the method of the invention includes a furnace 21 for oxidizing the methane to carbon dioxide, i.e., methane-derived carbon dioxide, and a cryogenic trap 23 for condensing the methane-derived carbon dioxide.

Finally the apparatus for use in the method includes a vacuum pump 25 subsequent to the cryogenic trap 23, which vacuum pump 25 in combination with valve 11 is adapted to provide a subatmospheric pressure throughout the above network of adsorbent traps, cryogenic traps and furnaces.

In operation, a sample of sea water, including a hydrocarbon gas dissolved therein, is collected by a sample collection device (not shown) and a first gaseous mixture is separated from the sea water sample by means of a vacuum chamber (not shown) adapted to flash off such first gaseous mixture from a major portion of the sea water. The first gaseous mixture is analyzed for the presence of hydrocarbons, e.g. by means of a gas chromatograph, and if hydrocarbons are found, the first gaseous mixture is routed to the apparatus of the invention.

The first gaseous mixture, which may include methane, oxygen, one or more higher hydrocarbons having at least two carbon atoms, carbon monoxide, carbon dioxide, one or more interfering gases exemplary of which are the oxides of sulfur and nitrogen, and water, is passed sequentially through an inlet 31, pressure gauge 33, and flow meter 35. The sample will typically be at a pressure of about 0 to about 1, preferably about 0.5 p.s.i.g. The sample is passed from flow meter 35 through a valve 37 which is a 3-way valve which may be actuated to route the first gaseous mixture to a vent or to valve 11.

The first gaseous mixture is then passed through valve 11, e.g. a needle valve, which is used to vary the flow through the instant apparatus so that the apparatus can operate under vacuum conditions and more efficiently separate and collect the various components of the first gaseous mixture. Any water and carbon dioxide present in the first gaseous mixture are removed by an adsorbent trap 13 which includes a solid adsorbent such as calcium chloride or calcium sulfate for the water and a solid adsorbent such as sodium hydroxide or other alkaline material for carbon dioxide. Preferabaly calcium sulfate is used to adsorb water and both adsorbents include an indicator to show when the adsorbent is saturated. The adsorbents are contained in a tube and may be mixed or sequentially placed in either order. The removal of water and carbon dioxide from said first gaseous mixture provides a second gaseous mixture free of water and carbon dioxide. In the drawing, the calcium chloride is designated as 13A. and the sodium hydroxide is designated as 13B, respectively.

The second gaseous mixture is then passed through a cryogenic trap 15 operated at a temperature sufficient to condense and thus remove any higher hydrocarbons and interfering gases from the second gaseous mixture.

Ordinarily, temperatures of −180° C. or less are employed. However, for convenience the temperature will be about −196° C., i.e., the temperature of liquid nitrogen.

A 4-way valve 16 may be utilized to isolate cryogenic trap 15 from the remainder of the apparatus for recovery of a sample including such higher hydrocarbons for analysis. Typically, the cryogenic trap 15 includes a bed of inert beads contained in a glass U-tube. Such U-tube may be immersed in a liquid nitrogen bath to provide a cryogenic trap. The sample may be collected from such first cryogenic trap by actuating valve 16 to isolate cryogenic trap 15 from the remainder of the apparatus, sealing the upper portion of each arm of the U-tube by fusion of the glass with a flame, and then removing the liquid nitrogen bath.

The interfering gases may also condense in cryogenic trap 15. It should be pointed out that the oxides of nitrogen and sulfur interfere with the isotopic analysis of hydrocarbons. In particular, in the prior art method for determining whether hydrocarbons are of thermogenic origin, the hydrocarbons are oxidized to carbon dioxide and the ratio of $^{13}C$ to $^{12}C$ in such carbon dioxide is determined by means of a mass spectrometer. Since $N_2O$ has a mass of 44 as does $^{12}CO_2$, an isotopic analysis would yield an inaccurate result. In addition it is well known that sulfur compounds interfere with a mass spectrometer analysis of carbon dioxide. However, the sample obtained from cryogenic trap 15 may be analyzed by gas chromotography to determine whether any heavier hydrocarbons contained therein are the usual components of a petroleum-derived hydrocarbon.

The effluent from cryogenic trap 15 is a third gaseous mixture free from the higher hydrocarbons and interfering gases. The third gaseous mixture is then treated to remove any carbon monoxide therefrom by passing such third gaseous mixture through a furnace 17 wherein carbon monoxide is oxidized to carbon dioxide. The furnace 17 is packed with a copper catalyst, for example, a catalyst comprising 50 percent, by weight, cupric oxide supported on alumina, or a cupric oxide wire catalyst, or other catalytically active form of cupric oxide and is operated at a temperature that is sufficient to oxidize the carbon monoxide to carbon dioxide without oxidizing methane to carbon dioxide. It should be noted that even some conversion of methane to carbon dioxide will skew the analysis of the sample, since the $^{13}C$ and $^{12}C$ -containing methane molecules will oxidize at different rates. To avoid this the temperature in furnace 17 is maintained at less than 200° C. Preferably, the temperature of operation for furnace 17 ranges from about 100° C. to about 150° C., e.g. about 125° C.

The third gaseous mixture now having carbon dioxide in place of the carbon monoxide is then passed to adsorbent trap 19 which may be identical to the adsorbent trap 13, i.e., the carbon dioxide may be absorbed on sodium hydroxide contained in said trap and any water remaining in the third gaseous mixture, may be adsorbed on calcium sulfate. In this manner, furnace 17 and adsorbent trap 19 may together remove carbon monoxide from the gaseous mixture to provide a fourth gaseous mixture free from carbon monoxide. This fourth gaseous mixture comprises substantially all of the methane originating in the gas sample entering inlet 31.

The fourth gaseous mixture is passed to a furnace 21 which is similar to furnace 17. The same catalyst may be utilized in furnace 21, as in furnace 17, alone or in combination with a separate catalyst comprising platinum. The separate catalyst may be any commercially available platinum on alumina catalyst suitable for the oxidation of methane to carbon dioxide. For example, a catalyst comprising 0.3 percent by weight, platinum supported on alumina has been found to be suitable for use in furnace 21. Furnace 21 may contain from about 1 to about 5 parts of the copper catalyst to 1 part of the platinum catalyst and operate at a temperature sufficient to oxidize substantially all of the methane to carbon dioxide. For example, where the above combination of catalysts are used, a temperature of at least about 600° C. is sufficient to oxidize all of the methane to carbon dioxide and water. However, when cupric oxide is utilized as the only catalyst in the second furnace, the operating temperature is preferably at least about 700° C., e.g., from about 750° to about 800° C. to oxidize all of the methane to carbon dioxide.

The methane-derived carbon dioxide is collected in cryogenic trap 23 which may include a U-tube immersed in liquid nitrogen or the other cryogenic media suitable for condensing the carbon dioxide and the water into a solid. The cryogenic trap 23 also has a 4-way valve 24 which may be used to isolate cryogenic trap 23 from the remainder of the apparatus for sample collection, in a manner similar to that disclosed for cryogenic trap 15 above.

The remainder of the gas, which is substantially oxygen in combination with any inert gas from the original sample, will be removed from the apparatus through vacuum pump 25. During the use of the apparatus for collecting samples, it is critical that the apparatus not be vented directly to the atmosphere. The positioning of vacuum pump 25 subsequent to the network of adsorbent traps, cryogenic traps and furnaces utilized to separate and collect the hydrocarbon components of the sample, prevents contamination of the condensed $CO_2$ by atmospheric carbon dioxide. In effect the vacuum pump 25 acts as a check valve for the instant apparatus which allows passage of a flow of gas out of the instant apparatus but prevents passage of atmospheric contaminants such as carbon dioxide into the apparatus. It has been unexpectedly discovered in this invention that, even though the prior art apparatus illustrated in British Pat. No. 2,074,726 operates at an overall positive pressure, fluctuations in the temperatures of the cryogenic traps during operation and especially upon start up, result in an intermitent vacuum at any atmospheric vent to a cryogenic trap. Such intermittent vacuum draws atmospheric contaminants through the atmospheric vent into the cryogenic traps wherein contaminants such as carbon dioxide may condense and contaminate the methane-derived carbon dioxide sample.

It is also found that operating the prior art apparatus at a positive pressure as disclosed in the British patent results in the condensation of oxygen in cryogenic traps that are cooled by liquid nitrogen, i.e. cooled to −196° C. When the U-tubes are sealed and removed from the cryogenic bath for analysis of the sample contained therein, the condensed oxygen may vaporize and burst the U-tube.

The operation of vacuum pump 25 an needle valve 11 and placement thereof subsequent to the network of adsorbent traps, cryogenic traps, and furnaces, and antecedent to such network, respectively, provides a sub-atmospheric pressure throughout the apparatus and continuous removal of oxygen and inert gases from the outlet of a cryogenic trap that is cooled by liquid nitrogen. Thus one may take advantage of a liquid nitrogen-cooled cryogenic trap, without fear of condensing the oxygen in the sample.

The instant apparatus may be operated at a pressure of less than about −5 p.s.i.g., e.g., about −7 p.s.i.g., at which pressure it has been found that oxygen does not condense in the above cryogenic traps.

The instant apparatus may include various additional three-way valves and pressure gauges, interposed throughout the network to assist in isolating various of the adsorbent traps, cryogenic traps, or furnaces for the purpose of disconnecting or testing the network for leaks. The number and/or the arrangement of such additional three-way valves and pressure gauges is within the ordinary skill of the art and hence need not be described in greater detail.

While particular embodiments of the invention have been described, it will be understood, of course, that the invention is not limited thereto since many obvious modifications can be made, and it is intended to include within this invention any such modificiation as will fall within the scope of the appended claims.

Having now described the invention, we claim:

1. A method for separating and collecting hydrocarbons which include methane from a gas obtained from the vicinity of an earth formation and obtaining information from such a gas which is useful in predicting the hydrocarbon potential of such an earth formation, said method comprising the steps of:
   obtaining a sample of a gas from the vicinity of an earth formation, said sample including methane;
   removing any water, carbon dioxide, and carbon monoxide from the sample and passing the sample through a cryogenic trap to separate and collect any interfering gases and hydrocarbons having at least two carbon atoms from the sample into the cryogenic trap, said removing and passing steps producing a first gas which contains the methane from the sample but which is free of water, carbon dioxide, carbon monoxide, interfering gases, and hydrocarbons having at least two carbon atoms;
   converting the methane in the first gas to form a condensed carbon dioxide sample;
   carrying out the removing, passing, and converting steps under a continuous subatmospheric pressure in such a manner as to prevent condensation of any oxygen in the cryogenic trap and to prevent any atmospheric carbon dioxide from entering into the sample, the first gas, the cryogenic trap, and the condensed carbon dioxide sample;
   determining the stable carbon isotope ratio of said condensed carbon dioxide sample which can then be used to predict the hydrocarbon potential of the earth formation.

2. The method defined in claim 1 wherein said cryogenic trap is maintained at temperatures less than about −180° C.

3. The method defined in claim 1, wherein said cryogenic trap contains a cryogenic medium consisting essentially of liquid nitrogen.

4. A method for separating and collecting hydrocarbons which include methane from a body of water overlaying an earth formation and obtaining information from such a body of water which is useful in predicting the hydrocarbon potential of such an earth formation, said method comprising the steps of, in sequence:
   (a) collecting a sample of water from the vicinity of an earth formation, said water sample comprising methane;
   (b) flashing said water sample into a liquid and a gaseous sample, said gaseous sample comprising the methane from the water sample and one or more of: oxygen, one or more hydrocarbons having at least two carbon atoms; methane, carbon monoxide, carbon dioxide, one or more interfering gases selected from the group consisting of oxides of sulfur and nitrogen, and water;
   (c) removing any water, carbon dioxide, carbon monoxide, hydrocarbons having at least two carbon atoms, and interfering gases selected from the group consisting of oxides of sulfur and nitrogen from said gaseous sample to provide a first gas which is free of water, carbon dioxide, carbon monoxide, hydrocarbons having at least two carbon atoms, and interfering gases selected from the group consisting of oxides of sulfur and nitrogen but which contains the methane from the gaseous sample;
   (d) oxidizing the methane in said first gas to form methane-derived carbon dioxide;
   (e) condensing the methane-derived carbon dioxide in said first gas as a condensed solid to provide a condensed carbon dioxide sample;
   (f) carrying out steps (c)–(e) under a continuous subatmospheric pressure in such a manner as to prevent condensation of any oxygen and prevent any atmospheric carbon dioxide from entering into the gaseous sample, the first gas, and the condensed carbon dioxide sample; and
   (h) determining the stable carbon isotope ratio of said condensed carbon dioxide sample which can then be used to predict the hydrocarbon potential of the earth formation.

5. The method defined in claim 4 wherein step (e) is carried out in a cryogenic trap at temperatures less than about −180° C.

6. The method defined in claim 4 wherein step (e) is carried out in a cryogenic trap which containes a cryogenic medium consisting essentially of liquid nitrogen.

7. A method for separating and collecting hydrocarbons which include methane from a gas obtained from the vicinity of an earth formation and obtaining information from such a gas which is useful in predicting the hydrocarbon potential of such an earth formation; said method comprising the steps of, in sequence:
   (a) collecting a sample of a gas from the vicinity of an earth formation, said sample comprising methane and one or more of: oxygen, one or more hydrocarbons having at least two carbon atoms, carbon monoxide, carbon dioxide, one o more interfering gases selected from the group consisting of oxides of sulfur and nitrogen, and water;
   (b) removing any water and carbon dioxide from the sample to provide a first gas which is free of water and carbon dioxide;
   (c) removing any hydrocarbons having at least two carbon atoms and any interfering gases selected from the group consisting of oxides of sulfur and nitrogen from said first gas to provide a second gas which is free of water, carbon dioxide, hydrocarbons having at least two carbon atoms, and interfering gases selected from the group consisting of oxides of sulfur and nitrogen;
   (d) removing any carbon monoxide from said second gas to provide a third gas which is free of water, carbon dioxide, hydrocarbons having at least two carbon atoms, interfering gases selected from the group consisting of oxides of sulfur and nitrogen, and carbon monoxide but contains the methane which was present in said sample;

(e) oxidizing the methane in said third gas to form methane-derived carbon dioxide;

(f) condensing the methane-derived carbon dioxide in said third gas to provide a condensed carbon dioxide sample;

(g) carrying out steps (b)–(f) under a continuous subatmospheric pressure in such a manner as to prevent condensation of any oxygen and prevent any atmospheric carbon dioxide from entering into the sample, the first gas, the second gas, the third gas, and the condensed carbon dioxide sample; and (h) determining the stable carbon isotope ratio of said condensed carbon dioxide sample which can then be used to predict the hydrocarbon potential of the earth formation.

8. The method of claim 7 wherein said methane-derived carbon dioxide is condensed using liquid nitrogen.

* * * * *